United States Patent
Premerlani et al.

(10) Patent No.: US 9,997,921 B2
(45) Date of Patent: Jun. 12, 2018

(54) SOLAR POWER CONVERSION SYSTEM AND METHOD

(71) Applicant: GENERAL ELECTRIC COMPANY, Schenectady, NY (US)

(72) Inventors: William James Premerlani, Scotia, NY (US); Patrick Hammel Hart, Ballston Lake, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 299 days.

(21) Appl. No.: 14/877,275

(22) Filed: Oct. 7, 2015

(65) Prior Publication Data
US 2017/0104333 A1    Apr. 13, 2017

(51) Int. Cl.
*H02J 3/38* (2006.01)
*H02M 7/44* (2006.01)
(Continued)

(52) U.S. Cl.
CPC ................ *H02J 3/383* (2013.01); *H02J 3/16* (2013.01); *H02J 2003/007* (2013.01); *H02M 7/44* (2013.01)

(58) Field of Classification Search
CPC .............................. H02J 3/38–3/50; H02J 3/16
See application file for complete search history.

(56) References Cited

U.S. PATENT DOCUMENTS

| | | |
|---|---|---|
| 4,916,377 A | 4/1990 | Terada et al. |
| 5,136,233 A | 8/1992 | Klinkenberg et al. |

(Continued)

FOREIGN PATENT DOCUMENTS

| | | |
|---|---|---|
| EP | 1841037 A2 | 10/2007 |
| EP | 2236820 A2 | 10/2010 |

(Continued)

OTHER PUBLICATIONS

W. Cao, Y. Ma, J. Wang, F. Wang, "Virtual series impedance emulation control for remote PV or wind farms", Apr. 24, 2014, IEEE, accessed via <http://ieeexplore.ieee.org/abstract/document/6803341/> on Sep. 22, 2017.*

(Continued)

*Primary Examiner* — Rexford Barnie
*Assistant Examiner* — David Shiao
(74) *Attorney, Agent, or Firm* — GE Global Patent Operation; Nitin Joshi

(57) ABSTRACT

A solar power conversion system includes a photovoltaic array having photovoltaic modules for generating direct current (DC) power. A power converter in the system converts the DC power to alternating current (AC) power. The AC power is transmitted to the power grid via a transformer coupled between the power converter and the power grid. The transformer is connected to the power grid at the point of common coupling (PCC) and to the power converter at output terminals. A voltage estimation module is configured to estimate a voltage at PCC based on a measured voltage magnitude, a measured real power and a measured reactive power at the output terminals, and a reactance of the transformer. A controller is provided in the system for generating switching command signals for the power converter based on the voltage at PCC.

16 Claims, 4 Drawing Sheets

(51) Int. Cl.
*H02J 3/16* (2006.01)
*H02J 3/00* (2006.01)

(56) References Cited

U.S. PATENT DOCUMENTS

| | | | |
|---|---|---|---|
| 5,402,057 A | | 3/1995 | D'Aquila et al. |
| 6,396,248 B1 | | 5/2002 | Sen et al. |
| 6,492,801 B1 | | 12/2002 | Sims et al. |
| 6,707,283 B1 | | 3/2004 | Ball |
| 6,841,976 B1 | | 1/2005 | Sen et al. |
| 7,508,173 B2 | | 3/2009 | Zhou et al. |
| 8,295,063 B2 | | 10/2012 | Gong et al. |
| 8,772,965 B2 | | 7/2014 | El-Barbain et al. |
| 8,774,974 B2 | | 7/2014 | Chee et al. |
| 8,816,531 B2 | | 8/2014 | Krok et al. |
| 9,450,513 B2 | | 9/2016 | Ohori et al. |
| 9,473,042 B1 | * | 10/2016 | Chu ................ H02M 7/44 |
| 2007/0135970 A1 | * | 6/2007 | Zhou ................ H02J 3/1835 700/286 |
| 2010/0134076 A1 | * | 6/2010 | Cardinal ................ G05F 1/70 323/207 |
| 2010/0138061 A1 | | 6/2010 | Walling et al. |
| 2010/0220499 A1 | | 9/2010 | Haj-Maharsi et al. |
| 2011/0316342 A1 | * | 12/2011 | El-Barbari ............ H02J 3/383 307/77 |
| 2012/0235498 A1 | | 9/2012 | Johnson et al. |
| 2013/0066480 A1 | | 3/2013 | Glavic et al. |
| 2013/0076134 A1 | | 3/2013 | Smith et al. |
| 2013/0077367 A1 | | 3/2013 | Zhu et al. |
| 2013/0148394 A1 | | 6/2013 | O'Brien et al. |
| 2013/0250635 A1 | | 9/2013 | Sivakumar et al. |
| 2013/0274946 A1 | | 10/2013 | Schelenz et al. |
| 2014/0100705 A1 | | 4/2014 | Shi et al. |
| 2014/0103888 A1 | | 4/2014 | Divan et al. |
| 2014/0339830 A1 | * | 11/2014 | Gupta .................. F03D 7/00 290/44 |
| 2015/0069978 A1 | | 3/2015 | Watanabe et al. |
| 2015/0337808 A1 | * | 11/2015 | Kang .................. F03D 7/048 290/44 |
| 2017/0040887 A1 | * | 2/2017 | Becattini ............ G01R 21/003 |

FOREIGN PATENT DOCUMENTS

| | | |
|---|---|---|
| EP | 2395651 A2 | 12/2011 |
| EP | 2521237 A1 | 11/2012 |
| EP | 2790312 A2 | 10/2014 |

OTHER PUBLICATIONS

R. A. Walling, "Grid Support Functions Implemented in Utility-Scale PV Systems," Published in Transmission and Distribution Conference and Exposition, Apr. 19-22, 2010, pp. 1-5.

G. Shirek, "Solar PV Modeling and Impacts on Distribution Systems," Milsoft Utility Solutions, 2012 Milsoft Users Conference, 40 pages.

International Search Report and Written Opinion issued in connection with corresponding PCT Application No. PCT/US2016/048811 dated Oct. 27, 2016.

Dong et al., "Improving Voltage Stability by Reactive Power Reserve Management", IEEE Transactions on Power Systems, vol. No. 20, Issue No. 01, pp. 338-345, Feb. 2005.

PCT Search Report and Written Opinion issued in connection with related PCT Application No. PCT/US2016/046238 dated Oct. 21, 2016.

U.S. Notice of Allowance issued in connection with related U.S. Appl. No. 14/877,345 dated Jul. 19, 2017.

* cited by examiner

SOLAR POWER CONVERSION SYSTEM AND METHOD

BACKGROUND

The invention relates generally to solar power conversion systems and, more particularly, to a system and method for controlling solar power conversion systems.

With the rising cost and scarcity of conventional energy sources and concerns about the environment, there is a significant interest in alternative energy sources such as solar power and wind power. Power converters are used to convert solar and wind energy to usable power that is transmitted over a power grid or directly to a load.

For utility scale solar power conversion systems, there are many challenges in connecting solar power converters to the power grid. Electricity applied to the electrical grid is required to meet grid connectivity expectations. These requirements address safety issues as well as power quality concerns. A central controller may be used to control the general operations of the power converters in the solar power conversion system as well as to coordinate combined power from the power converters by generating complex commands regarding curtailment and power output for example. The central controller typically monitors grid signals at the point of interconnection to the grid and generates various commands that are sent to local controllers embedded within individual power converters. In such embodiments, if the grid signals at the point of interconnection are not available to the central controller then the central controller is unable to transmit accurate commands and control signals, the power converters may cease to operate in a worst case scenario or, even if operable, will experience increased operational losses and reduced efficiency.

Hence, there is a need for an improved system to address the aforementioned issues.

BRIEF DESCRIPTION

In accordance with an embodiment of the present technique, a solar power conversion system including a photovoltaic array having photovoltaic modules for generating direct current (DC) power is provided. The system further includes a power converter for converting the DC power to alternating current (AC) power and a transformer coupled between the power converter and a power grid for transmitting the AC power to the power grid, wherein the transformer is connected to the power grid at the point of common coupling (PCC) and to the power converter at output terminals. The system also includes a voltage estimation module configured to estimate a voltage at PCC based on a measured voltage magnitude, a measured real power and a measured reactive power at the output terminals, and a reactance of the transformer. A controller is also provided in the system for generating switching command signals for the power converter based on the voltage at PCC.

In accordance with another embodiment of the present technique, a method to transmit solar power to a power grid including providing a photovoltaic array having photovoltaic modules for generating direct current (DC) power is provided. The method also includes providing a power converter for converting the DC power to alternating current (AC) power and coupling a transformer between the power converter and the power grid for transmitting the AC power to the power grid, wherein the transformer is connected to the power grid at the point of common coupling (PCC) and to the power converter at output terminals. The method further includes estimating a voltage at PCC based on a measured voltage magnitude, a measured real power and a measured reactive power at the output terminals, and a reactance of the transformer and generating switching command signals for the power converter based on the voltage at PCC.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit," "circuitry," "controller," and "processor" may include either a single component or a plurality of components, which are either active and/or passive and are connected or otherwise coupled together to provide the described function.

Figure 1:
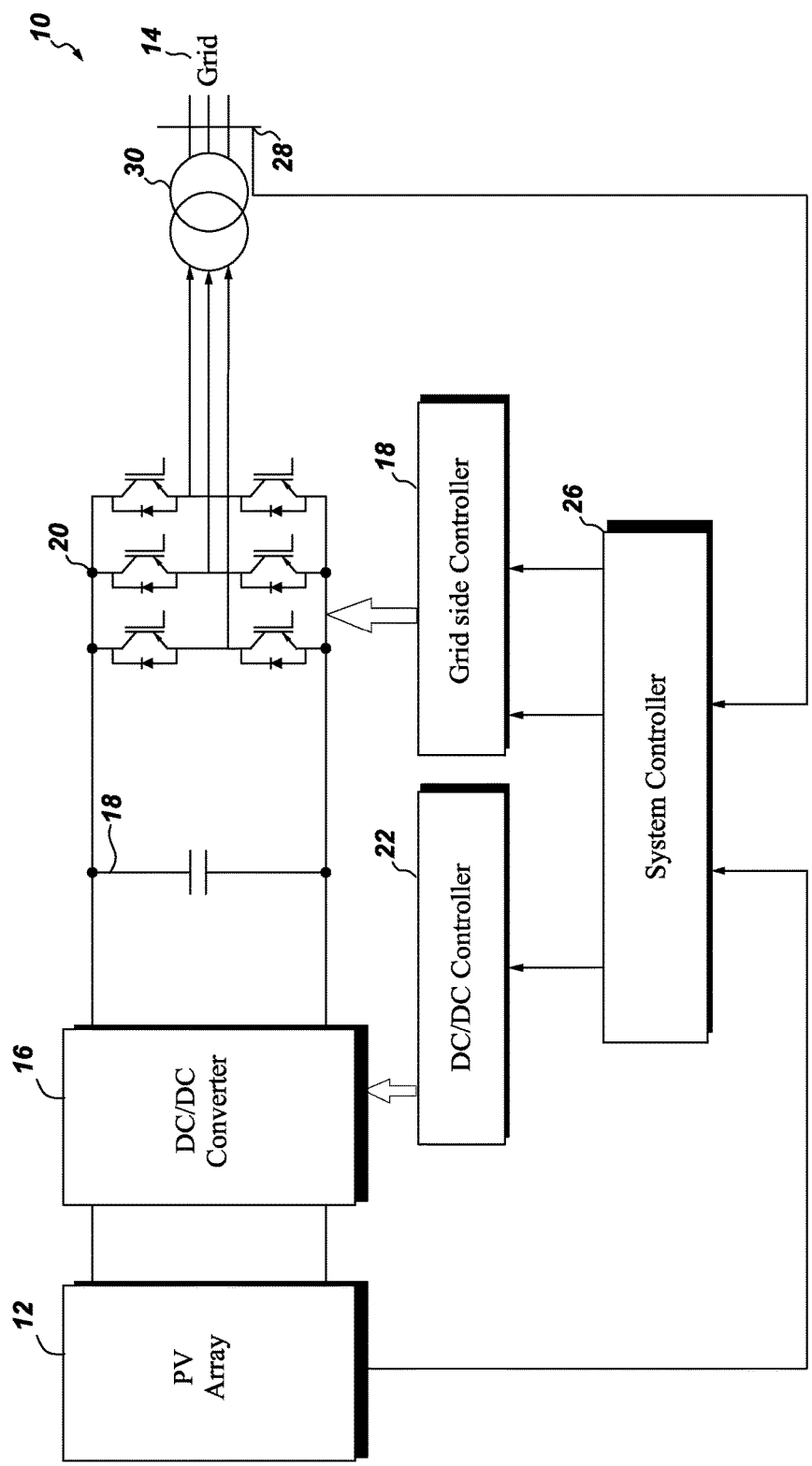
FIG. 1 is a schematic representation of a solar power generation system.

FIG. 1 illustrates a solar power generation system 10. The power generation system includes a photovoltaic (PV) array 12 including a plurality of connected PV modules (not shown). The PV array is connected to a power grid 14 through a DC/DC converter 16, a DC link 18, and a grid side three-phase DC/AC converter 20. In other embodiments, the grid side three-phase converter may be replaced by multiple single-phase converters. In one embodiment, the DC/DC converter 16 maintains a constant DC voltage at the DC link 18, and thus the energy flow from the PV module 12 to the power grid 14 is managed. The DC/DC converter 16 is controlled by a DC/DC controller 22, and the grid side converter 20 is controlled by a grid side controller 18. A system controller 26 generates a reference DC voltage command, a reference output voltage magnitude command, and a reference frequency command for the DC/DC converter 16 and the grid side converter 20 respectively. In other systems, a single controller may be used for the multiple control functions shown in FIG. 1. Filters (not shown) may be used in the system for removing harmonics from the system output power, and transformer 30 is used for matching grid side converter output voltage to the grid voltage at the point of common coupling (PCC) 28. Power grid 14 may comprise a utility grid or any other system of connecting power generation systems and loads.

Generally, real power output generated by PV module fluctuates throughout the day based on sunlight at any given time. This fluctuation in real power output results in fluctuation of current and so the voltage drop in resistance (R) and reactance (X) of the transformer 30. The change in voltage (ΔV) at PCC 28 because of the change in real power (ΔP) may be given as:

$$\Delta V = (\Delta P \cdot R - \Delta Q \cdot X)/V \qquad (1)$$

In the equation above, ΔQ is change in reactive power. The voltage fluctuation (ΔV) may have adverse impacts on grid voltage. The grid operators then may need to employ capacitor banks or voltage tap changes to suppress this adverse impact of voltage fluctuation. Therefore, in some cases, the grid operators may require solar power system operators to minimize the voltage fluctuation. In the equation above, if the goal is to make ΔV zero, then the reactive power Q needs to be varied in synchronism with variation in real power P. In other words, the change in reactive power to compensate for change in real power to avoid the voltage fluctuation may be given as:

$$\Delta Q = \Delta P \cdot R / X \qquad (2)$$

The above changes in reactive power are generally supplied by grid side DC/AC converter 20. The grid side DC/AC converter functionally operates as a static synchronous compensator (STATCOM) to supply the required reactive power. In one embodiment, a closed loop system as shown in FIG. 1 is employed to measure the changes in voltage at PCC 28 and to accordingly regulate the reactive power generated by the grid side DC/AC converter 20. However, in some embodiments, measurements signals at PCC 28 are not available.

According to one embodiment of the present technique, measurement signals at output terminals of the grid converter and estimated voltage drop at transformer 30 are utilized to control the PCC voltage. In other words, regulation of the PCC voltage is accomplished by substituting an estimate of the PCC voltage for the measured PCC voltage. The PCC voltage may be estimated from measurement signals at output terminals and the short circuit reactance of the transformer.

Figure 2:
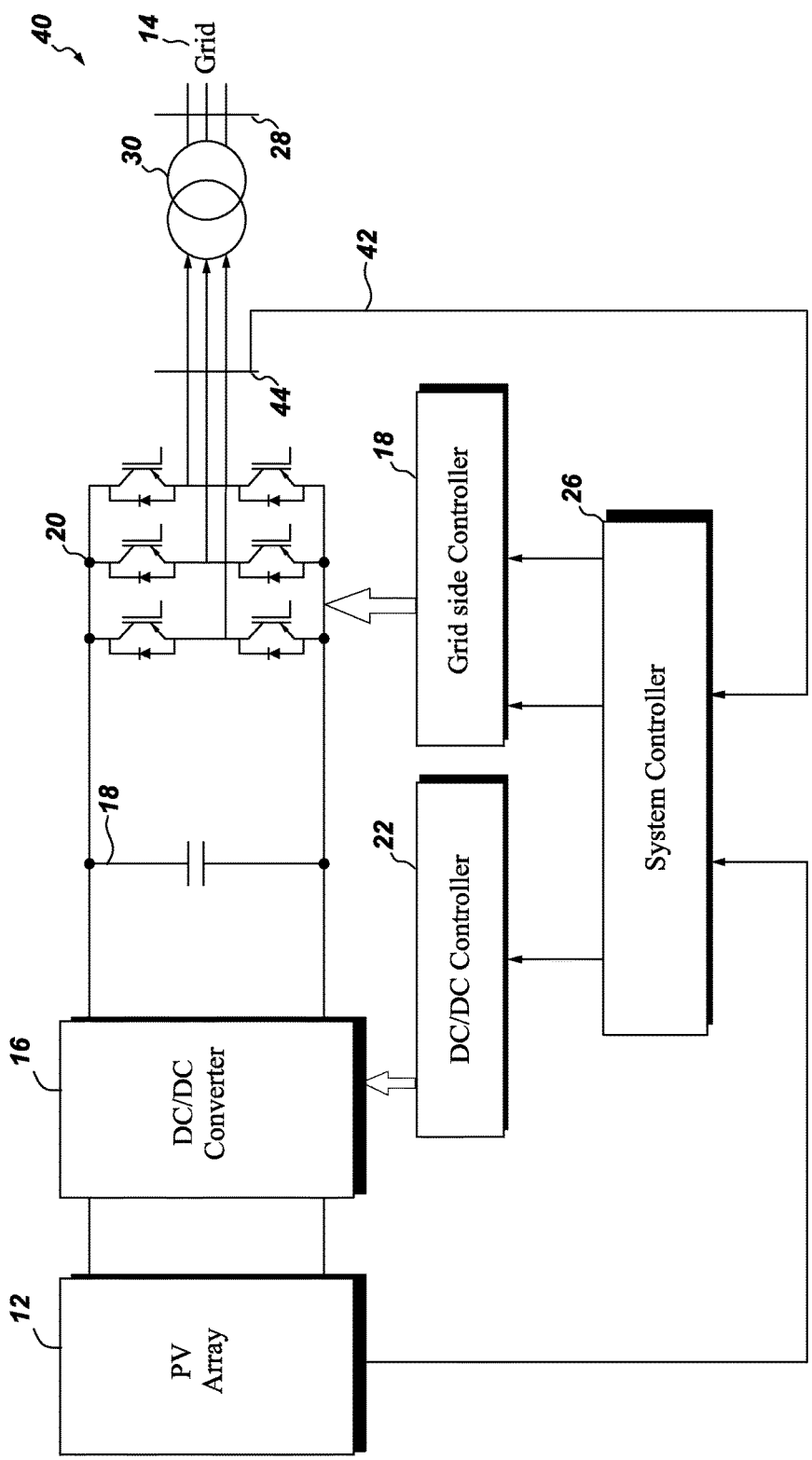
FIG. 2 is a schematic representation of a solar power generation system in accordance with an embodiment of the invention.

FIG. 2 is a schematic representation of the solar power conversion system 40 in accordance with an embodiment of the present technique. As can be seen, in this embodiment, measurement signal feedbacks 42 are provided to system controller 26 from output terminals 44 of converter 20 instead of PCC 28. In one embodiment, the measurement signals 42 include real power (P) and reactive power (Q) magnitude measurements. The real and reactive power magnitude measurements include real numbers and not complex numbers, i.e., no phase angle is involved.

In terms of complex number, the voltage ($V_p$) at PCC 28 may be given as:

$$V_p = (V_s + j \cdot 0) + j \cdot X \cdot I \qquad (3)$$

where $V_s$ is the voltage at output terminals 44, I is the current phasor in transformer and X is the reactance of the transformer. Voltage $V_s$ is considered reference voltage and thus, its phase angle is considered to be zero and magnitude equal to $V_s$. Furthermore, in the equation above, the voltage drop across the transformer is assumed to be dominated by its reactance, and the winding resistance (R) is ignored. The transformer reactance X may be known from transformer parameters or may be estimated. Further, as the above equation is in terms of complex signals, the current I needs to be measured in terms of phasor quantity i.e., a phase angle as well as a magnitude of current I needs to be measured which can be measured only by a phasor measurement unit. Therefore, the control of grid side converter 20 is further simplified below in terms of only magnitude values of measurement signals P and Q.

The real (P) and reactive power (Q) magnitudes flowing out of output terminals 44 may be given as:

$$P + j \cdot Q = V_s \cdot j \cdot I^* \qquad (4)$$

where I* is a complex conjugate of current phasor I. The above equation (4) now can be solved for determining current phasor I in terms of real (P) and reactive power (Q) magnitudes.

$$I = (P - j \cdot Q)/V_s \qquad (5)$$

Now substituting equation 5 into equation 3 leads to:

$$V_P = V_S + \frac{X \cdot (Q + j \cdot P)}{V_s} \qquad (6)$$

In terms of voltage magnitudes, equation 6 becomes:

$$|V_P|^2 = V_S^2 + 2 \cdot X \cdot Q + \frac{X^2 \cdot (P^2 + Q^2)}{V_S^2} \qquad (7)$$

or $$|V_P| = \sqrt{V_S^2 + 2 \cdot X \cdot Q + \frac{X^2 \cdot (P^2 + Q^2)}{V_S^2}} \qquad (8)$$

It should be noted here that in the above equation all quantities $V_p$, $V_s$, and X may be single phase line to neutral quantities or positive sequence or three phase vector magnitude quantities. If single phase line to neutral quantities are used for $V_p$, $V_s$, and X then the real (P) and reactive power (Q) will be single phase quantities. On the other hand if positive sequence or three phase vector magnitude quantities are used for $V_p$, $V_s$, and X then P and Q will be three phase quantities.

Equation 7 can also be recast into the following form:

$$|V_P|^2 = V_S^2 + 2 \cdot X \cdot Q + X^2 \cdot |I|^2 \qquad (9)$$

It should be noted that usually the reactance X of the transformer is rather small on a per unit basis, generally on the order of 0.05. Therefore, the $X^2$ term in the above equation may be ignored. In that case, a good approximation for equations 7 and 9 is:

$$V_P \approx V_S + \frac{X \cdot Q}{V_S} \qquad (10)$$

Figure 3:
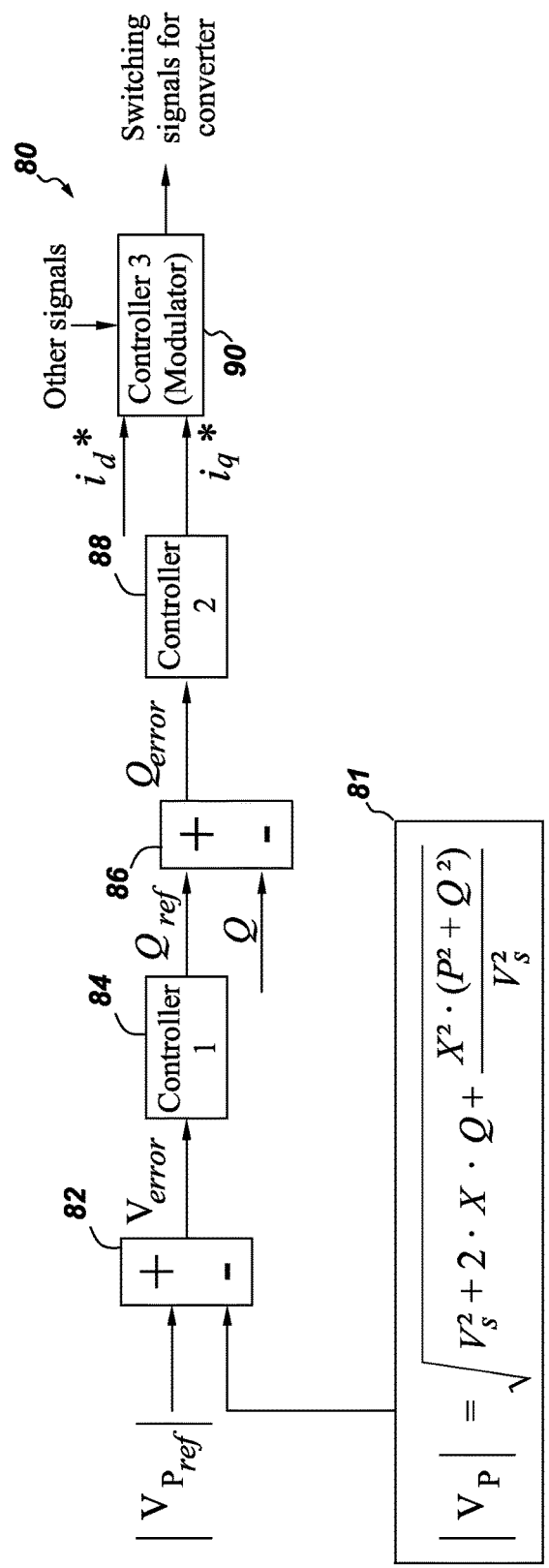
FIG. 3 is a block diagram representation of a voltage controller for use in the grid side controller of FIG. 2, in accordance with an embodiment of the present technique.

FIG. 3 shows a voltage controller 80 for use in grid side controller 18 of FIG. 2, in accordance with an embodiment of the present technique. Voltage controller receives input signals such as a reference voltage magnitude $V_{pref}$ for the voltage $V_p$ at PCC 28 and the estimated voltage magnitude $V_p$. A voltage estimation module 81 determines the estimated voltage magnitude $V_p$. In one embodiment, the voltage estimation module 81 may be provided outside of the voltage controller 80. The estimated voltage magnitude $V_p$ may be determined by voltage estimation module 81 based on voltage magnitude $V_s$ measured at output terminals 44, reactance X of the transformer and measured real and reactive power magnitude, P and Q respectively. The reference voltage magnitude $V_{pref}$ may be determined by a system operator based on system conditions. An error voltage $V_{error}$ between reference voltage magnitude $V_{pref}$ and the estimated voltage magnitude $V_p$ is determined by subtraction block 252. The error voltage $V_{error}$ is provided to a first controller 84 which further generates a reference reactive power magnitude $Q_{ref}$. The reference reactive power magnitude $Q_{ref}$ is then compared with the measured reactive power magnitude Q in subtraction block 254 and an reactive power error $Q_{error}$ error generated by block 254 is provided to a second controller 88. Second controller 88 then generates a q-domain reference current signal $i_q^*$ which is used along with a d-domain reference current signal $i_d^*$ by a third controller 90 to generate switching signals for grid converter 20. It should be noted that third controller 90 may receive other input signals such as measured d and q-domain current signals $i_q$ and $i_d$ and voltage and/or power signals. Further, third controller 90 may also include a modulator for generating switching signals based on the reference and measured current and voltage signals. The d-domain reference current signal $i_d$ may be determined by a system operator or other controllers (not shown).

Figure 4:
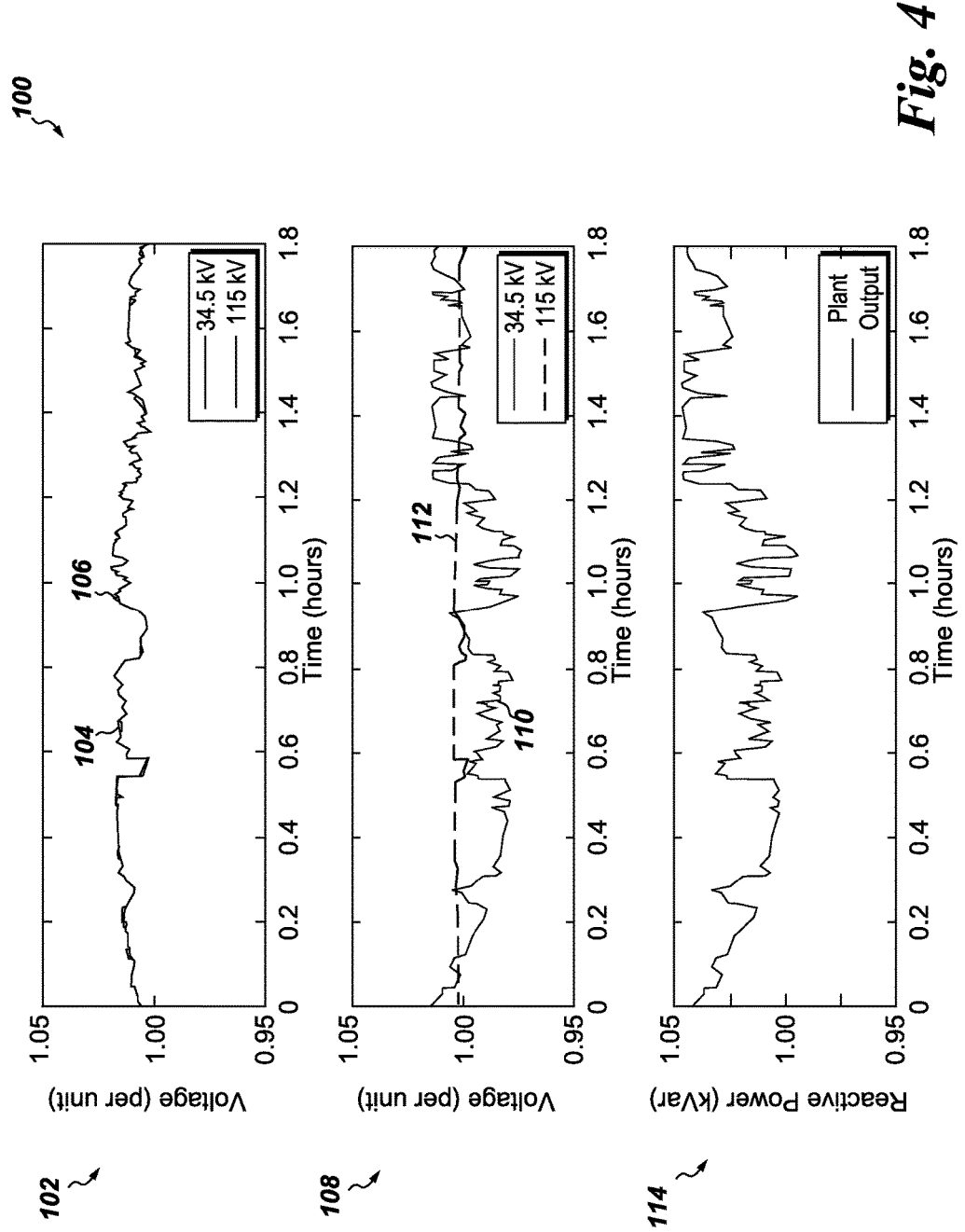
FIG. 4 is a graphical representation of three simulation plots in accordance with an embodiment of the present technique.

FIG. 4 illustrates a graphical representation 100 of three simulation plots in accordance with an embodiment of the present technique. Simulation plot 102 shows two voltages plots a voltage plot 104 for the voltage at output terminals 44 and another voltage plot 106 for the voltage at PCC 28 in absence of any voltage control. As can be seen shapes of both voltage plots 104 and 106 are exactly matching each other because no reactive power in response to voltage variations has been injected. It should be noted that these simulation plots 102 and 108 are in per unit values i.e., they do not represent actual volts value rather percentage representations of those volts value. Furthermore, plots 102 and 108 are not voltage waveforms, rather voltage magnitude plots.

Simulation plot 108 shows two voltages plots, a voltage plot 110 for the voltage at output terminals 44 and another voltage plot 112 for the voltage at PCC 28 in presence of voltage control as outlined above in FIG. 3. As can be seen compared to voltage plot 106, when the voltage control is started, the voltage plot 112 has less voltage variations. Furthermore, it can be seen that shapes of both voltage plots 110 and 112 do not exactly match each other because the reactive power in response to voltage variations is being injected now. This injected reactive power varies the voltage drop in transformer reactance X. Simulation plot 114 shows the reactive power injected into transformer 30 in response to the voltage variation. It can be seen that the shape of voltage plot 110 varies in accordance with the reactive power injected as in plot 114.

One of the advantages of the present technique is it allows to regulate the voltage at the point of common coupling without any parameter at the point of common coupling.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A solar power conversion system comprising:
    a photovoltaic array having photovoltaic modules for generating direct current (DC) power;
    a power converter for converting the DC power to alternating current (AC) power;
    a transformer coupled between the power converter and a power grid for transmitting the AC power to the power grid, wherein the transformer is connected to the power grid at a point of common coupling (PCC) and to the power converter at output terminals of the power converter;
    a voltage estimation module configured to estimate a voltage at PCC based on a measured voltage magnitude, a measured real power and a measured reactive power at the output terminals, and a reactance of the transformer; and
    a controller for generating switching command signals for the power converter based on the voltage at PCC;
    wherein the voltage estimation module estimates the voltage at the PCC based on the following equation:

$$|V_P| = \sqrt{V_S^2 + 2 \cdot X \cdot Q + \frac{X^2 \cdot (P^2 + Q^2)}{V_S^2}}$$

where $V_p$ is the estimated voltage at PCC, X is the transformer reactance and $V_s$, P and Q are the measured voltage magnitude, the measured real power and the measured reactive power at the output terminals respectively.

2. The system of claim 1 further comprising a DC to DC converter connected between the PV array and a DC link to maintain a constant DC voltage at the DC link.

3. The system of claim 2 comprising a DC to DC controller to control the operation of the DC to DC converter.

4. The system of claim 1 further comprising filters connected between the power converter and the output terminals for removing harmonics from the AC power.

5. The system of claim 1, wherein the power converter provides reactive power to the transformer to compensate for a voltage variation at the PCC.

6. The system of claim 1, wherein $V_p$, $V_s$, and X include single phase line to neutral quantities or positive sequence quantities or three phase vector magnitude quantities.

7. The system of claim 1 further comprising a first controller to generate a reference reactive power magnitude for the power converter based on an error voltage.

8. The system of claim 7 comprising a first subtractor to generate the error voltage based on a reference voltage at PCC and the estimated voltage at PCC.

9. The system of claim 8, wherein the reference voltage at PCC is determined by a system operator based on system conditions.

10. The system of claim 9 comprising a second controller to generate a q-domain reference current signal based on a reactive power error between the reference reactive power magnitude and the measured reactive power.

11. A method to transmit solar power to a power grid, the method comprising:
    providing a photovoltaic array having photovoltaic modules for generating direct current (DC) power;

providing a power converter for converting the DC power to alternating current (AC) power;

coupling a transformer between the power converter and the power grid for transmitting the AC power to the power grid, wherein the transformer is connected to the power grid at a point of common coupling (PCC) and to the power converter at output terminals of the power converter;

estimating a voltage at PCC based on a measured voltage magnitude, a measured real power and a measured reactive power at the output terminals, and a reactance of the transformer; and generating switching command signals for the power converter based on the voltage at PCC;

wherein the voltage at PCC is estimated based on the following equations:

$$|V_P| = \sqrt{V_S^2 + 2 \cdot X \cdot Q + \frac{X^2 \cdot (P^2 + Q^2)}{V_S^2}}$$

where $V_p$ is the estimated voltage at PCC, X is the transformer reactance and $V_s$, P and Q are the measured voltage magnitude, the measured real power and the measured reactive power at the output terminals respectively.

12. The method of claim 11, further comprising connecting a DC to DC converter between the PV array and a DC link to maintain a constant DC voltage at the DC link.

13. The method of claim 11 comprising providing reactive power to the transformer from the power converter to compensate for a voltage variation at the PCC.

14. The method of claim 11, wherein $V_p$, $V_s$, and X include single phase line to neutral quantities or positive sequence quantities or three phase vector magnitude quantities.

15. The method of claim 11 further comprising generating a reference reactive power magnitude for the power converter based on an error voltage between a reference voltage at PCC and the estimated voltage at PCC.

16. The method of claim 15 comprising generating a q-domain reference current signal based on a reactive power error between the reference reactive power magnitude and the measured reactive power.

* * * * *